Oct. 26, 1954     R. D. WAITE     2,692,613
MULTIPLE WEIGHTED RELIEF VALVE
Filed June 27, 1949     2 Sheets-Sheet 1
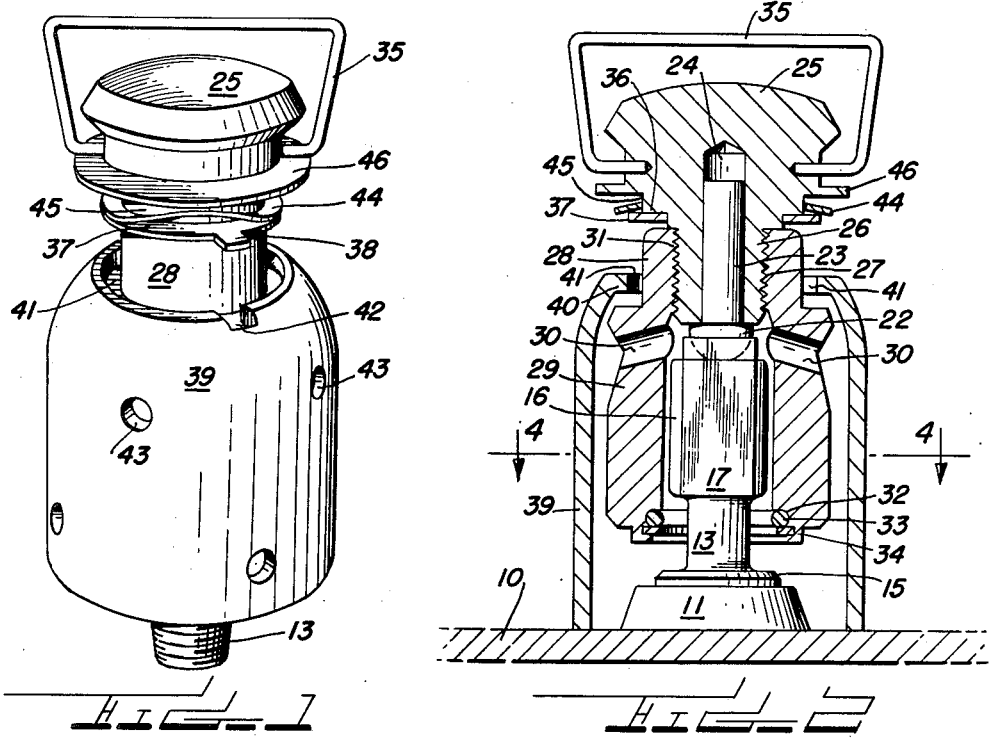
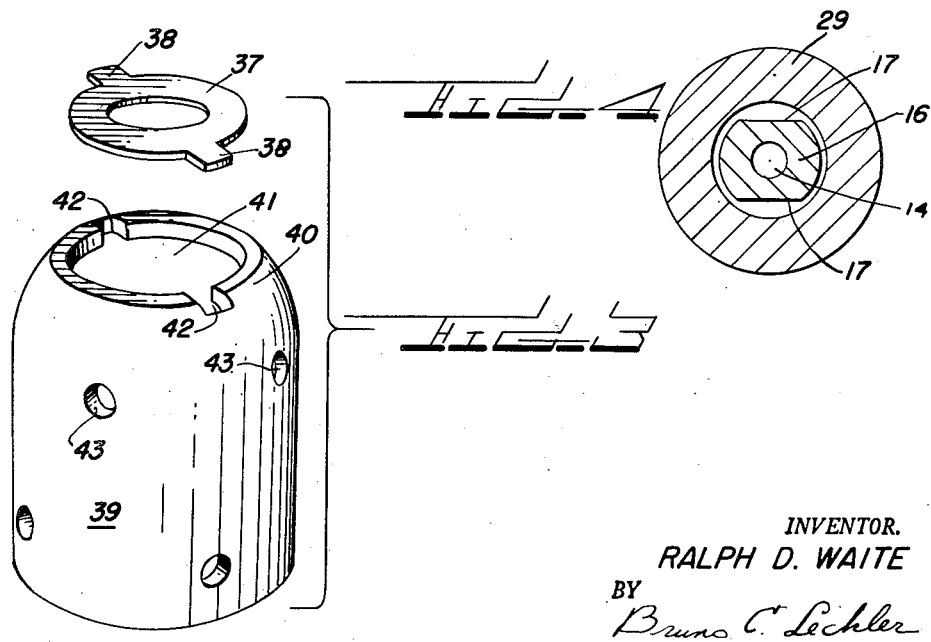
INVENTOR.
RALPH D. WAITE
BY
Bruno C. Lechler
ATTORNEY Oct. 26, 1954    R. D. WAITE    2,692,613
MULTIPLE WEIGHTED RELIEF VALVE
Filed June 27, 1949    2 Sheets-Sheet 2
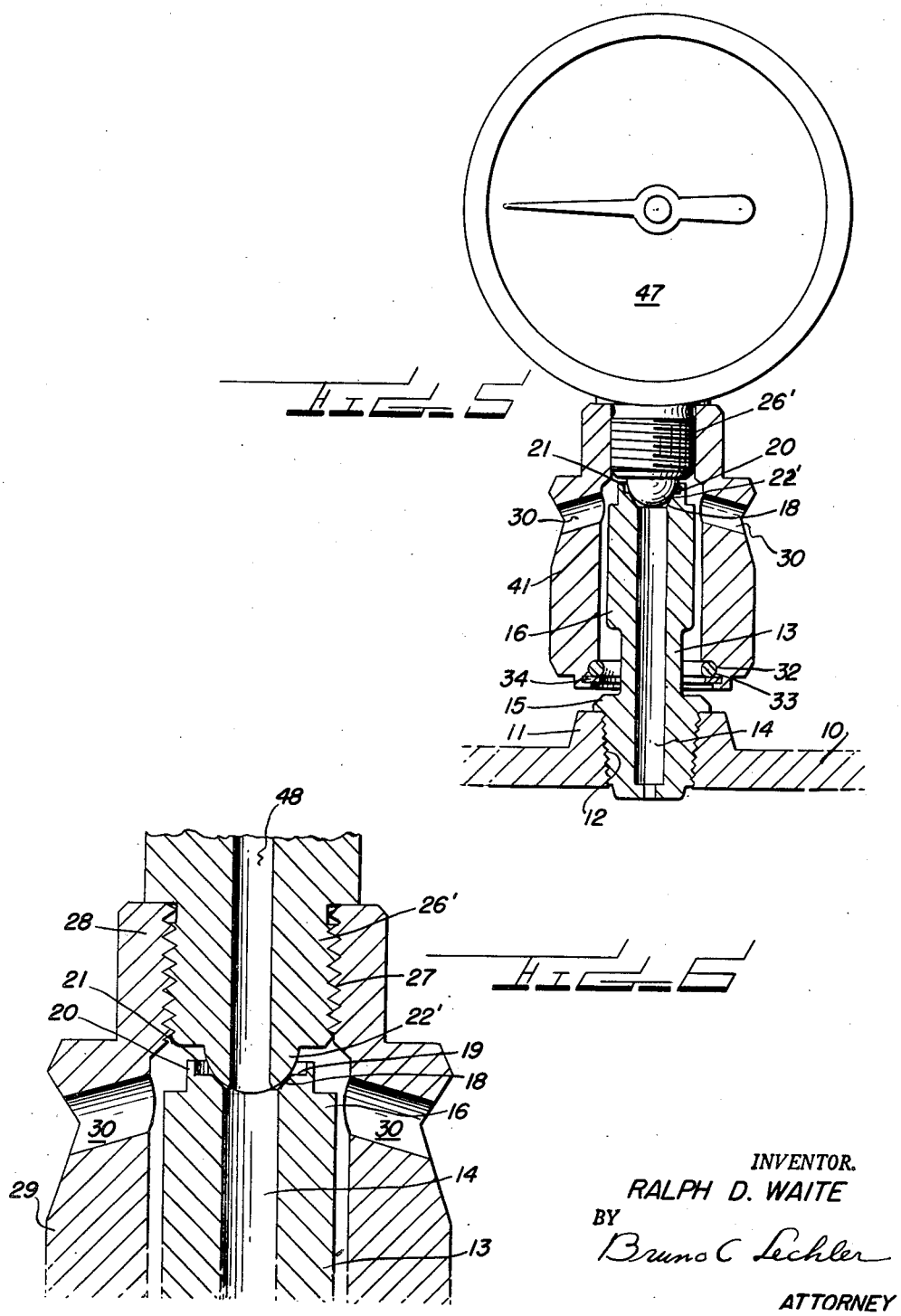
INVENTOR.
RALPH D. WAITE
BY Bruno C. Lechler
ATTORNEY Patented Oct. 26, 1954

2,692,613

UNITED STATES PATENT OFFICE 2,692,613

MULTIPLE WEIGHTED RELIEF VALVE

Ralph D. Waite, Sellersville, Pa., assignor to American Machine and Metals, Inc., New York, N. Y., a corporation of Delaware Application June 27, 1949, Serial No. 101,659

5 Claims. (Cl. 137—534)

It is desirable that the safety valve with which most pressure cookers are provided permit the escape of vapors or steam to no larger extent than is necessary to relieve over-pressure in the cooker. Vapors escaping in excess represent losses not only of juice, but also of aroma.

It is an object of the invention to provide a safety valve for pressure cookers which will keep the loss of vapor and aroma to a minimum. As one means to achieve this object a valve member having a curved longitudinal section is used in cooperation with a conical valve seat. Another means for the same object is the provision of an open chamber into which the valve seat opens.

Another object of the invention is to provide a safety valve for pressure cookers wherein a spherical valve member is used in cooperation with a conical valve seat, the latter opening into an open chamber.

Another object of the invention is to provide a safety valve for pressure cookers whose valve member may be subjected at will to the action of a weight displaceable relative to the valve member to give the user of the pressure cooker a choice of two blow-off pressures.

It is a further object of the invention to provide a safety valve for pressure cookers wherein the valve member is permanently connected with a main weight for holding said valve member in closing position and an additional weight is normally supported by the lid of the cooker so as to be without effect upon the valve member, but which can be moved into a position in which it is in effective connection with the valve member so that the latter can open only against the combined effects of both weights.

A further object of the invention is to provide a safety valve of the kind just referred to, wherein the additional weight can be hung on a carrying member which is connected with the valve member and means are arranged above said carrying member for preventing the additional weight in its suspended position from moving upwardly relative to the valve member.

Another object of the invention is to provide a safety valve for pressure cookers combined with a pressure gauge, the gauge having a special stem carrying a valve member having a curved longitudinal section adapted to co-operate with a conical valve seat.

In a preferred embodiment of the invention the previously mentioned weight which is permanently connected with the valve member has an inner screw thread into which an outer screw thread rigidly connected to the valve member removably fits. This outer screw thread may either form part of a plug or of the stem of a pressure gauge so that said plug and pressure gauge may be substituted for each other.

Other objects and features of the invention will appear as the description proceeds, reference being had to the accompanying drawings in which:

Fig. 1 is a perspective view of one embodiment of the invention;

Fig. 2 shows the same embodiment in vertical section;

Fig. 3 is a perspective view of two parts of the device shown in Figs. 1 and 2;

Fig. 4 is a section along the line 4—4 in Fig. 2;

Fig. 5 is a front elevation, partly in section, of a safety valve-pressure gauge combination; and Fig. 6 shows in a partial vertical section drawn at a larger scale some parts of the device of Fig. 5.

In the drawings, the reference numeral 10 denotes the top or lid of a pressure cooker. The lid 10 has a boss 11 into which there is screwed a threaded end 12 of a stem 13. The stem 13 has a longitudinal bore 14 and a flange 15. A thickened portion 16 of the stem 13 is provided with two oppositely arranged flat surfaces 17 which permit the application of a wrench for screwing the stem 13 into place. At its upper end the stem 13 forms a conical seat 18 for a valve member 22 to be described presently. The upper end of the seat 18 is surrounded by a flat horizontal surface 19 which in turn is surrounded by a rim 20 whereby an open chamber 21 is formed.

The valve member 22 is, at least next to that part of its surface which comes into contact with the conical seat 18, of such a shape as to provide a tangential contact with this conical seat. For that purpose the valve member is of a curved longitudinal section so that, when the valve member 22 is seated upon the conical seat 18, the latter contacts the former along a circle situated in a horizontal plane. The surface with which the conical seat 18 comes into tangential contact may form part of a sphere, of an ellipsoid, a paraboloid, or the like curved surface. In the example shown the valve member 22 is in the form of a hemisphere and according to Fig. 2 this hemisphere is carried by a stem 23 fitting snugly into an internal bore 24 of a plug 25. The lower portion of the plug 25 forms a nipple 26 having an outer screw thread 27 for engagement with a thread 31 provided at the inside of a neck 28 of a weight 29 which, in the form of a skirt, extends downwardly around the vertically extending stem 13. The weight 29 has substantially radial passages 30 for the escape of vapors or steam when the valve member 22 is off its seat 18. At what pressure in the cooker the valve member 22 is to be lifted from its seat depends on the weight of the plug 25 and all parts carried by the latter, including the skirt 29. In the lower inner part of the skirt 29 there is provided a circular groove 32 accommodating an annular ring 33 and a locking ring 34. The ring 33 which is held in place by the locking ring 34 may be slightly deformed so as to be slightly out of round. The ring extends inwardly far enough so as to prevent the skirt or weight 29 from accidentally passing over the thickened portion 16 of the stem 13 when the lid 10 with the parts carried thereby is inverted. The ring 33 permits, however, the removal of the plug 25 with the valve member 22 and the skirt 29 from the stem 13 when the skirt 29 or the plug 25 connected thereto is firmly grasped and pulled away from the lid 10, springing the distorted ring 33. To facilitate this removal operation, a handle 35 is attached to the plug 25.

Situated above the neck 28 of the weight 29, e. g. clamped between said neck 28 and a shoulder 36 of the plug 25, so as to form a flange is a washer 37 having a number of extensions 38. In the drawing two such extensions are shown but there may be provided more or less than two extensions. The inwardly turned upper end 40 of a cup shaped auxiliary weight 39 has a central opening 41 and extending outwardly from said central opening are as many radially extending openings 42 as the washer or flange 37 has extensions 38. The central opening 41 is of a diameter at least as large as the diameter of the flange 37 to permit the auxiliary weight 39 to be moved past this flange. In the wall of the auxiliary weight 39 there are provided holes 43 for the escape of vapors or steam.

Normally the cup shaped auxiliary weight 39 rests upon the lid 10 of the pressure cooker as is shown in Fig. 2. In this position the auxiliary weight 39 is held out of contact with the main weight 29 so that only the weight of the latter acts upon the valve member 22 for holding it in the closed position. When the pressure in the cooker is high enough to overcome the weight of the main weight or skirt 29 and of the plug 25 screwed thereto, then the valve member 22 is lifted off its seat 18 and vapors coming through the bore 14 in the stem 13 may escape past the valve member 22 and through the passages 30 in the skirt 29. The weight of the combined skirt 29 and plug 25 is such that the valve member 22 is lifted at a pre-set pressure, normally chosen at 10 lbs. per square inch. The auxiliary weight 39, while inactive as long as supported by the lid 10 of the cooker, can be rendered effective to increase the pressure at which the valve is to open by being hung upon the flange 37 so as to bring to bear upon the valve member 22 the sum of the weights of the main weight 29 and of the auxiliary weight 39. To do this, the auxiliary weight 39 is turned so that the openings 42 in the inturned end 40 of the cup 39 are in line with the extensions 38 of the flange 37 and thus the auxiliary weight 39 can be raised to a position in which the inturned end 40 of 39 is completely above the flange 37. In this position the auxiliary weight 39 is turned through a small angle about its axis and then released so that the inturned end 40 comes to rest upon the extensions 38 of the flange 37. As the flange 37 is in rigid connection with the plug 25 and thereby to the skirt 29 and to the valve member 22, it transmits the gravitational force of the auxiliary weight 39 to the valve member 22. In order now to lift this valve member from its seat 18 the pressure in the cooker must rise to a point where it will overcome not only the weight of the skirt 29 and of the plug 25 but of the weight of the auxiliary weight 39 as well. The cup 39 may be so designed that when this cup is supported by the plug 25, 15 lbs. of pressure in the cooker will be required to open the safety valve.

Means may be provided to hold the cup shaped weight 39 in place after it has been hung upon the extensions 38 of the flange 37. These means are preferably of a resilient nature and in the example shown in Figs. 1 and 2 a bent spring washer 44 is placed above the flange 37 within a neck 45 formed by said flange 37 and another flange 46 extending out from the plug 25. As long as the cup shaped auxiliary weight 39 is in the position shown in either Fig. 1 or Fig. 2, the distorted flexible washer 44 touches both flanges 46 and 37. When the cup 39 is raised its inwardly turned upper end comes to bear against the flexible washer 44 and flattens the latter. Upon the cup 39 having been turned slightly so that the slots 42 are no longer aligned with the extensions 38 of the washer 37 and these extensions support the cup 39, the spring washer 44 prevents the cup 39 from slipping about when the valve opens due to excessive pressure in the cooker.

The new safety valve distinguishes itself from previously used safety valves by a better seat of the valve member and by an extremely small loss of vapor and aroma. The reason for the improved performance achieved by the invention appears to be that the tangential contact along an entire circumferential circle of the valve member 22 with the conical seat surface 18 affords a better seal over extended periods than has been achieved heretofore, and further that the liquid pool forming in the open chamber 24 by condensation of the escaping steam or vapor on the wall 20 of that chamber when the valve member 23 temporarily opens, improves the sealing effect. When the valve member 22 is lifted a single blast of vapor passes out and lowers the pressure in the cooker sufficiently to allow the valve member to reseat and stay reseated until the pressure in the cooker has again built up.

By way of illustration it may be mentioned that excellent results have been obtained by mounting on the top or lid of the pressure cooker a stem of a diameter of $3/8''$ axially drilled with a bore of .106''. The upper part of the stem was turned to an external diameter of $9/32''$ and was counterbored $1/4''$ in diameter to a depth of $3/32''$ leaving a flat annular surface surrounded by a rim having a thickness of $1/64''$ and a height of $3/32''$. A conical counterbore having an included angle of 86° was run down through the flat annular surface. The valve member was in the form of a hemisphere of .206'' in diameter so that the circle along which the conical surface was in contact with the spherical valve member had a diameter of .1506''.

Fig. 5 shows the plug 25 of Figs. 1 and 2 replaced by a pressure gauge 47 which has a threaded stem 26' carrying a valve body 22'. The stem 26' is similar to the nipple 26 of Fig. 2 and the hemispheric valve body 22' is similar to the valve body 22 of Fig. 2 so that the pressure gauge 47 and the plug 25 can be substituted for each other. It will be noticed, however, that the stem 26′ has an axial passage 48 which also extends through the valve member 22′ so as to establish communication between the axial bore 14 in the stem 13 and the interior of the pressure gauge 47.

While I have illustrated in the drawings two particular embodiments of the invention, it will be understood that modifications may be made in the design and arrangement of the parts without departing from the spirit of the invention or the scope of the appended claims.

What I claim is:

1. In a safety valve for pressure cookers having a lid, an upright tubular element, a longitudinal bore in said element, a conical valve seat at the upper end of said bore, a valve member for holding said bore normally closed when said valve member is caused to rest upon said seat under the action of a main weight secured to said valve member, at least a portion of said valve member, including a circle along which said valve member, when seated, makes tangential contact with said conical seat, being of curved shape in longitudinal section, a cup-shaped additional weight adapted to be normally held out of contact with said main weight by being supported by the lid of the cooker, a carrying member connected to said valve member and adapted to support said additional weight in a raised position thereof, and means arranged above said carrying member for restraining said additional weight, when suspended from said carrying member, from moving relative to said valve member.

2. In a safety valve for pressure cookers having a lid, an upright tubular element, a longitudinal bore in said element, a conical valve seat at the upper end of said bore, a valve member for holding said bore normally closed when said valve member is caused to rest upon said seat under the action of a main weight secured to said valve member, at least a portion of said valve member, including a circle along which said valve member, when seated, makes tangential contact with said conical seat, being of curved shape in longitudinal section, a cup-shaped additional weight adapted to be normally held out of contact with said main weight by being supported by the lid of the cooker, and a bent resilient washer interposed between two flanges arranged one above the other and connected to said valve member, the lower of said two flanges being adapted to serve as support for said additional weight in a raised position of the latter.

3. In a safety valve for pressure cookers having a lid, an upright tubular element, a longitudinal bore in said element, a conical valve seat at the upper end of said bore, a valve member for holding said bore normally closed when said valve member is caused to rest upon said seat under the action of a main weight secured to said valve member, at least a portion of said valve member, including a circle along which said valve member, when seated, makes tangential contact with said conical seat, being of curved shape in longitudinal section, an additional weight adapted to be normally held out of contact with said main weight by being supported by the lid of the cooker, a flange connected to said valve member, and lateral extensions on said flange, the upper end of said additional weight being turned inwardly and having openings to permit said additional weight to be moved upwardly past said extensions and then to be turned about its axis into a position in which said extensions are disaligned with said openings and serve as supports for said additional weight.

4. In a safety valve for pressure cookers having a lid, an upright tubular element, a longitudinal bore in said element, a conical valve seat at the upper end of said bore, a valve member for holding said bore normally closed when said valve member is caused to rest upon said seat under the action of a main weight secured to said valve member, at least a portion of said valve member, including a circle along which said valve member, when seated, makes tangential contact with said conical seat, being of curved shape in longitudinal section, an additional weight adapted to be normally held out of contact with said main weight by being supported by the lid of the cooker, two flanges arranged one above the other, a bent flexible washer interposed between said two flanges, lateral extensions on the lower of said two flanges, the upper end of said additional weight being turned inwardly and having openings to permit said additional weight to be moved upwardly past said extensions and then to be turned about its axis into a position in which said extensions serve as supports for said additional weight and said washer bears from above upon said inwardly turned upper end of said additional weight.

5. In a safety valve for pressure cookers having a lid, an upright tubular element, a longitudinal bore in said element, a conical valve seat at the upper end of said bore, a valve member for holding said bore normally closed when said valve member rests upon said seat, at least a portion of said valve member, including a circle along which said valve member, when seated, makes tangential contact with said conical seat, being of curved shape in longitudinal section, an open chamber in said element adjoining the outer end of said conical valve seat, a hollow main weight surrounding said tubular element and said open chamber and being axially movable relative thereto, an inner screw thread on said main weight and an outer screw thread removably fitting into said inner thread of said main weight and rigidly connected to said valve member, a cup-shaped additional weight adapted to be normally held out of contact with said main weight by being supported by the lid of the cooker, a carrying member connected to said valve member and adapted to support said additional weight in a raised position thereof, and flexible means arranged above said carrying member for restraining said additional weight, when suspended from said carrying member, from moving relative to said valve member.

References Cited in the file of this patent

UNITED STATES PATENTS

| Number | Name | Date |
|---|---|---|
| 129,138 | Jewell | July 16, 1872 |
| 1,117,399 | Kibele | Nov. 17, 1914 |
| 1,474,192 | Gessler | Nov. 13, 1923 |
| 1,751,867 | Manuel | Mar. 25, 1930 |
| 2,043,453 | Vickers | June 9, 1936 |
| 2,308,320 | Stephens | Jan. 12, 1943 |
| 2,428,483 | Wittenberg | Oct. 7, 1947 |
| 2,467,716 | Abercrombie | Apr. 19, 1949 |
| 2,544,186 | Sayers | Mar. 6, 1951 |
| 2,554,931 | Weldon | May 29, 1951 |

FOREIGN PATENTS

| Number | Country | Date |
|---|---|---|
| 1,308 | Great Britain | 1879 |